US011341406B1

(12) United States Patent
Redmon et al.

(10) Patent No.: US 11,341,406 B1
(45) Date of Patent: May 24, 2022

(54) DETERMINING GRASPING PARAMETERS FOR GRASPING OF AN OBJECT BY A ROBOT GRASPING END EFFECTOR

(71) Applicant: X Development LLC, Mountain View, CA (US)

(72) Inventors: Joseph Redmon, San Francisco, CA (US); Anelia Angelova, Sunnyvale, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 920 days.

(21) Appl. No.: 16/133,409

(22) Filed: Sep. 17, 2018

Related U.S. Application Data

(63) Continuation of application No. 14/723,373, filed on May 27, 2015, now Pat. No. 10,089,575.

(51) Int. Cl.
*G06N 3/08* (2006.01)
*G06N 3/04* (2006.01)
*B25J 9/16* (2006.01)

(52) U.S. Cl.
CPC ............ *G06N 3/08* (2013.01); *B25J 9/163* (2013.01); *B25J 9/1697* (2013.01); *G06N 3/049* (2013.01); *Y10S 901/03* (2013.01); *Y10S 901/47* (2013.01)

(58) Field of Classification Search
CPC .. G06N 3/08; G06N 3/049; B25J 9/163; B25J 9/1697; Y10S 901/03; Y10S 901/47
See application file for complete search history.

(56) References Cited

U.S. PATENT DOCUMENTS

| 5,548,512 | A | * | 8/1996 | Quraishi | G05D 1/0255 |
| | | | | | 701/23 |
| 8,355,816 | B2 | | 1/2013 | Saito | |
| 8,782,077 | B1 | | 7/2014 | Rowley et al. | |
| 8,879,855 | B2 | | 11/2014 | Angelova et al. | |
| 9,014,854 | B2 | | 4/2015 | Kim et al. | |
| 2010/0312148 | A1 | | 12/2010 | Sato | |
| 2012/0053728 | A1 | | 3/2012 | Theodorus et al. | |
| 2013/0245822 | A1 | | 9/2013 | Kawanami et al. | |
| 2013/0346348 | A1 | | 12/2013 | Buehler et al. | |

(Continued)

OTHER PUBLICATIONS

Lenz, Ian, Honglak Lee, and Ashutosh Saxena. "Deep learning for detecting robotic grasps." The International Journal of Robotics Research 34.4-5 (2015): 705-724. (Year: 2015).*

(Continued)

*Primary Examiner* — Eric Nilsson
(74) *Attorney, Agent, or Firm* — Middleton Reutlinger

(57) ABSTRACT

Methods and apparatus related to training and/or utilizing a convolutional neural network to generate grasping parameters for an object. The grasping parameters can be used by a robot control system to enable the robot control system to position a robot grasping end effector to grasp the object. The trained convolutional neural network provides a direct regression from image data to grasping parameters. For example, the convolutional neural network may be trained to enable generation of grasping parameters in a single regression through the convolutional neural network. In some implementations, the grasping parameters may define at least: a "reference point" for positioning the grasping end effector for the grasp; and an orientation of the grasping end effector for the grasp.

19 Claims, 11 Drawing Sheets

(56) References Cited

U.S. PATENT DOCUMENTS

2015/0003678 A1   1/2015   Watanabe et al.
2015/0025682 A1   1/2015   Sato et al.

OTHER PUBLICATIONS

Bezak, Pavol, Yury Rafailovich Nikitin, and Pavol Božk. "Robotic grasping system using convolutional neural networks." American Journal of Mechanical Engineering 2.7 (2014): 216-218. (Year: 2014).*

Mouri, Tetsuya, Haruhisa Kawasaki, and Satoshi Ito. "Unknown object grasping strategy imitating human grasping reflex for anthropomorphic robot hand." Journal of Advanced Mechanical Design, Systems, and Manufacturing 1.1 (2007): 1-11. (Year: 2007).*

Angelova, A. et al. "Development and Deployment of a Large-Scale Flower Recognition Mobile App." NEC Labs America Technical Report (Dec. 2012), http://www.nec-labs.com/research/information/infoAM_website/pdfs/MobileFlora. pdf (2012); 10 pages.

Angelova, A., & Zhu, S. (Jun. 2013). Efficient Object Detection and Segmentation for Fine-Grained Recognition in Computer Vision and Pattern Recognition (CVPR), 2013 IEEE Conference on (pp. 811-818). IEEE.

Helmick, D. M., Angelova, A., Livianu, M., & Matthies, L. H. (2007, March). Terrain Adaptive Navigation for Mars Rovers. In Aerospace Conference, 2007 IEEE (pp. 1-11). IEEE.

Matthies, L. et al. "Computer Vision on Mars." International Journal of Computer Vision 75, No. 1 (2007): 67-92.

Kukacka, M. "Overview of Deep Neural Networks." WDS '12 Proceedings of Contributed Papers, Part 1, 100-105, 2012. http://www.mff.cuni.cz/veda/konference/wds/proc/pdf12/WDS_12_117_i1_Kukacka.pdf.

Schmidhuber, J. "Deep Learning in Neural Networks: An Overview." Neural Networks 61 (2015): 85-117. Technical Report IDSIA-03-14 / arXiv: 1404 7828 v4 [cs.NE] (88 pages, 888 references).

Angelova, A., Data Pruning, Master's Thesis, CS Dept., California Institute of Technology, 2004; 69 pages.

Larochelle, H. et al. "Exploring Strategies for Training Deep Neural Networks." The Journal of Machine Learning Research 10 (2009): 1-40.

Pelossof, R. et al. "An SVM Learning Approach to Robotic Grasping." In Robotics and Automation, 2004. Proceedings. ICRA'04. 2004 IEEE International Conference on, vol. 4, pp. 3512-3518. IEEE, 2004.

Lai, K. et al. "A Large-Scale Hierarchical Multi-View RBG-D Object Dataset." In Robotics and Automation (ICRA), 2011 IEEE International Conference on, pp. 1817-1824. IEEE, 2011.

Blum, M. et al. "A Learned Feature Descriptor for Object Recognition in RGB-D Data." In Robotics and Automation (ICRA), 2012 IEEE International Conference on, pp. 1298-1303. IEEE, 2012.

Endres, F. et al. "An Evaluation of the RGB-D SLAM System." In Robotics and Automation (ICRA), 2012 IEEE International Conference on, pp. 1691-1696. IEEE, 2012.

Miller, A. "Automatic Grasp Planning Using Shape Primitives." In Robotics and Automation, 2003. Proceedings. CRA'03. IEEE International Conference on, vol. 2, pp. 1824-1829. IEEE, 2003.

Donahue, J. et al. "DeCAF: A Deep Convolutional Activation Feature for Generic Visual Recognition." arXiv preprint arXiv:1310.1531 (2013); 10 pages.

Lenz, I. et al. "Deep Learning for Detecting Robotic Grasps." In Proceedings of Robotics: Science and Systems, Berlin, Germany, Jun. 2013; 8 pages.

Szegedy, C. et al. "Deep Neural Networks for Object Detection." In Advances in Neural Information Processing Systems, pp. 2553-2561. 2013.

Lai, K. et al. "Detection-Based Object Labeling in 3D Scenes." In Robotics and Automation (ICRA), 2012 IEEE International Conference on, pp. 1330-1337. IEEE, 2012.

Jiang, Y. et al. (May 2011). "Efficient Grasping from RGBD Images: Learning using a new Rectangle Representation." In Robotics and Automation (ICRA), 2011 IEEE International Conference on (pp. 3304-3311).

Rao, D. et al. "Grasping Novel Objects with Depth Segmentation." In Intelligent Robots and Systems (IROS), 2010 IEEE/RSJ International Conference on, pp. 2578-2585. IEEE, 2010.

Miller, A. et al. "Graspit! A Versatile Simulator for Robotic Grasping." Robotics & Automation Magazine, IEEE 11, No. 4 (2004): 110-122.

Deng, J. et al. "Imagenet: A Large-Scale Hierarchical Image Database." In Computer Vision and Pattern Recognition, 2009. CVPR 2009. IEEE Conference on, pp. 248-255. IEEE, 2009.

Krizhevsky, A. et al. "ImageNet Classification with Deep Convolutional Neural Networks." In Advances in neural information processing systems, pp. 1097-1105. 2012.

Oquab, M. et al. "Learning and Transferring Mid-Level Image Representations Using Convolutional Neural Networks." In Computer Vision and Pattern Recognition (CVPR), 2014 IEEE Conference on, pp. 1717-1724. IEEE, Jun. 2014. Available: http://hal.inria.fr/hal-00911179.

Leon, B. et al. "Opengrasp: A Toolkit for Robot Grasping Simulation." In Simulation, Modeling, and Programming for Autonomous Robots (pp. 109-120). 2010. Springer Berlin Heidelberg.

Henry, P. et al. "RGB-D Mapping: Using Depth Cameras for Dense 3D Modeling of Indoor Environments." In the 12th International Symposium on Experimental Robotics (ISER. 2010); 2 pages.

Girshick, R. et al. (Jun. 2014). Rich Feature Hierarchies for Accurate Object Detection and Semantic Segmentation. In Computer Vision and Pattern Recognition (CVPR), 2014 IEEE Conference on (pp. 580-587). IEEE.

Bicchi, A. et al. "Robotic Grasping and Contact: A Review." In IEEE International Conference on Robotics & Automation (ICRA). Citeseer, 2000, pp. 348-353. 2000.

Saxena, A. et al. "Robotic Grasping of Novel Objects Using Vision." The International Journal of Robotics Research 27, No. 2 (2008): 157-173.

Saxena, A. et al. "Robotic Grasping of Novel Objects." In Advances in neural information processing systems, pp. 1209-1216. 2006.

Erhan, D. et al. "Scalable Object Detection Using Deep Neural Networks." In Computer Vision and Pattern Recognition (CVPR), 2014 IEEE Conference on, pp. 2155-2162. IEEE, 2014.

Varley, J. et al. "Generating Multi-Fingered Robotic Grasps via Deep Learning." http://www.cs.columbia.edu/~jvarley/MultiFingeredGraspsViaDeepLearning pdf. 2014; 8 pages.

Yang, Y. et al. "Robot Learning Manipulation Action Plans by "Watching" Unconstrained Videos from the World Wide Web." Under Review (2015); 7 pages.

Zhang, Y. et al. "Improving Object Detection with Deep Convolutional Networks via Bayesian Optimization and Structured Prediction." arXiv preprint arXiv:1504.03293 (2015); 28 pages.

Bezak, P. et al. "Robotic Grasping System Using Convolutional Neural Networks." American Journal of Mechanical Engineering 2, No. 7 (2014): 216-218.

Hudson, Nicolas, et al. "Model-Based Autonomous System for Performing Dexterous, Human-Level Manipulation Tasks." Autonomous Robots 36.1-2 (2014): 31-49.

Lenz, I. et al. "Deep Learning for Detecting Robotic Grasps." The International Journal of Robotics Research 34.4-5 (2015): 705-724.

* cited by examiner

DETERMINING GRASPING PARAMETERS FOR GRASPING OF AN OBJECT BY A ROBOT GRASPING END EFFECTOR

BACKGROUND

Many robots are programmed to utilize one or more end effectors to grasp one or more objects. For example, a robot may utilize a gripper end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

SUMMARY

This specification is directed generally to methods and apparatus for determining grasping parameters for grasping of an object by a robot end effector. Some implementations are generally directed to training a convolutional neural network (also referred to herein as a "CNN") to enable utilization of the CNN to generate grasping parameters for a grasp of an object based on image data for the object. Some implementations are generally directed to using a trained CNN to generate grasping parameters for an object based on image data for the object. In some implementations, the CNN may be trained to enable generation of grasping parameters in a single regression through the CNN.

In some implementations of training the CNN, the CNN is trained to enable generation of grasping parameters for only a single grasp of the object. For example, the CNN may be trained based on a plurality of training examples that each include input that comprises image data for a respective electronic image of a respective object. Each of the training examples may further include output that comprises grasping parameters for only a single randomly selected labeled valid grasp for the respective object.

In some other implementations of training the CNN, the CNN is trained to enable generation of a plurality of grasps of the object, along with confidence measures for each of the grasps. For example, the CNN may be trained based on a plurality of training examples that each include input that comprises image data for a respective electronic image of a respective object. Each of the training examples may further include output that comprises, for each of a plurality of cells containing one of a plurality of selected labeled valid grasps, grasping parameters for a respective selected labeled valid grasp and a confidence measure that indicates the cell contains a valid grasp. In one or both of the above implementations of training the CNN, the output of each of the training examples may optionally further comprise a classification category of the object of the training example.

In some implementations of using a trained CNN to generate grasping parameters for an object based on image data for the object, the grasping parameters are generated based on a single regression through the CNN. Grasping parameters generated in the single regression may be provided to facilitate grasping of the object by a control system of a robot. For example, the control system may utilize the grasping parameters in positioning a grasping end effector of the robot relative to the object in advance of actuation of the end effector to grasp the object.

In some implementations, a method is provided that comprises identifying image data for an electronic image of an object and identifying a plurality of labeled valid grasps for the object. The image data comprises one or more channels and each of the labeled valid grasps defines grasping parameters for a respective one of the grasps for the object. The method further comprises selecting, for a cell of the image data, a single grasp of the labeled valid grasps and generating training example output that comprises the grasping parameters for the selected single grasp and that omits the grasping parameters for other of the labeled valid grasps. The grasping parameters for the selected single grasp define at least a two-dimensional grasping coordinate defining a position of a robot grasping end effector for the grasp of the object and an orientation parameter defining an orientation of the robot grasping end effector for the grasp of the object. The method further comprises providing, as a training example to a convolutional neural network, the image data as input of the training example and the training example output as output of the training example. The convolutional neural network is trained based on the training example.

This method and other implementations of technology disclosed herein may each optionally include one or more of the following features.

In some implementations, the cell comprises an entirety of the image data and selecting the single grasp of the labeled valid grasps comprises selecting only the single grasp for the training example. In some of those implementations, the method further comprises translating and rotating the electronic image to generate a modified electronic image, identifying modified image data for the modified electronic image, and selecting, for the modified electronic image, a second single grasp of the labeled valid grasps. In those implementations, the method further comprises providing, as an additional training example to the convolutional neural network, the modified image data as additional input of the additional training example and second grasping parameters of the selected second single grasp as additional training example output of the additional training example. The convolutional neural network is trained based on the additional training example.

In some implementations, the cell of the image data is a single cell of a plurality of cells of an N by N partition of the image data and the training example output includes, for each of the cells of the N by N partition of the image data, grasping parameters neurons. In some of those implementations, generating the training example output comprises defining the grasping parameters as the grasping parameters neurons for the cell based on a center coordinate of the single grasp being in the cell. In some of those implementations, the grasping parameters further comprise a value for a confidence measure that indicates a high likelihood of a valid grasp; and generating the training example output further comprises defining the value as one of the grasping parameters neurons for the cell based on the center coordinate of the single grasp being in the cell. The method may further comprise selecting additional grasps of the valid grasps and determining additional cells of the plurality of cells that each include the center coordinate of one of the additional grasps. In those implementations, generating the training example output may further comprise: defining, for each of the additional cells, the grasping parameters for a respective of the additional grasps as respective of the grasping neurons for the respective of the additional cells, including defining the value as one of the grasping parameter neurons for each of the additional cells; and defining null values for the grasping neurons for each of the cells not included in the cell or the additional cells. In some of those implementations, training the convolutional neural network based on the training example may comprise backpropogating error for one or more of the grasping parameter neurons for one or more cells not included in the cell or the additional cells, such as a set of the cells that each include the center coordinate of at least one of the valid labeled grasps but that do not include the cell or the additional cells.

In some implementations, identifying the image data comprises identifying the image data based on a subset of the electronic image that includes the object.

In some implementations, the image data comprises a depth channel, a first color channel, and a second color channel and the electronic image comprises a third color channel. In some of those implementations, the method further comprises omitting the third color channel from the input of the training example. In versions of those implementations, the method further comprises pre-training at least portions of the convolutional neural network based on a plurality of images that include red, green, and blue channels, and that omit a depth channel.

In some implementations, the one or more channels of the image data comprise at least one depth channel. In some of those implementations, the image data further comprises at least one color channel such as red, green, and/or blue channels. Additional and/or alternative types of channels may form all or portions of image data, such as an infrared channel.

In some implementations, a method is provided that comprises applying image data for an object to an input layer of a trained convolutional neural network and generating, over the convolutional neural network, grasping parameters fora grasp of the object. The grasping parameters are generated based on the image data and are generated in a single regression through the convolutional neural network. The grasping parameters for the grasp of the object define at least a two-dimensional grasping coordinate defining a position of a robot grasping end effector for the grasp of the object and an orientation parameter defining an orientation of the robot grasping end effector for the grasp of the object. The method further comprises providing the generated grasping parameters for grasping of the object by the grasping end effector.

This method and other implementations of technology disclosed herein may each optionally include one or more of the following features.

In some implementations, the grasping parameters for the grasp of the object further define a width defining a distance between opposing actuable members of the grasping end effector for the grasp.

In some implementations, the grasping parameters for the grasp of the object are the only grasping parameters generated in the single regression through the convolutional neural network.

In some implementations, the grasping parameters for the grasp of the object further define a confidence measure for the grasp. The confidence measure indicates a likelihood that the grasp is valid. In some of those implementations, the method further comprises generating, over the convolutional neural network in the single regression through the convolutional neural network, additional grasping parameters for additional grasps of the object. The additional grasping parameters for each of the additional grasps of the object define at least a respective two-dimensional grasping coordinate, a respective orientation parameter, and a respective confidence measure indicating a respective likelihood that a respective of the additional grasps is valid. In some versions of those implementations, the method further comprises selecting the grasping parameters for the grasp based on comparison of the confidence measure for the grasp to the respective confidence measures for the additional grasps; and positioning the robot grasping end effector based on the grasping parameters. The method may further comprises: selecting one of the additional grasps as a back-up grasp based on comparison of the respective confidence measures for the additional grasps; detecting a failed grasp of the object, the failed grasp based on positioning the robot grasping end effector based on the grasping parameters; and in response to detecting the failed grasp, positioning the grasping end effector based on the additional grasping parameters of the back-up grasp.

In some implementations, the method further comprises positioning the grasping end effector based on the provided grasping parameters.

In some implementations, the method further comprise generating, over the convolutional neural network in the single regression through the convolutional neural network, a classification category of the object. In some of those implementations, the method further comprises determining an additional grasping parameter for the grasp based on the classification category of the object.

In some implementations, the image data comprises a depth channel, a first color channel, and a second color channel. In some of those implementations, the method further comprises capturing an image that comprises the object, the depth channel, the first color channel, and the second color channel and selecting the image data based on a subset of the image that includes the object. In some versions of those implementations, the image further comprises a third color channel and the method further comprises omitting the third color channel from the image data.

In some implementations, the image data comprise at least one depth channel. In some of those implementations, the image data further comprises at least one color channel such as red, green, and/or blue channels. Additional and/or alternative types of channels may form all or portions of image data, such as an infrared channel.

Other implementations may include a non-transitory computer readable storage medium storing instructions executable by a processor (e.g., a central processing unit (CPU) or graphics processing unit (GPU)) to perform a method such as one or more of the methods described above. Yet another implementation may include a system of one or more computers and/or one or more robots that include one or more processors operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Some implementations of the technology described herein are generally directed to utilizing a convolutional neural network to generate grasping parameters for an object. The grasping parameters can be used by a robot control system to enable the robot control system to position a robot end effector to "grasp" the object. The trained convolutional neural network provides a direct regression from raw image data (e.g., image data that comprises a depth channel and two or more of red, blue, and/or green channels) to grasping parameters. For example, in some implementations the grasping parameters may define at least: a "reference point" for positioning the robot end effector for the grasp; and an orientation of the robot end effector for the grasp.

Some implementations of the technology utilize a single regression of a trained convolutional neural network to analyze image data of an image that includes an object and generate, as output of the single regression, grasping parameters for one or more viable grasps of the object. Such application of a single regression (i.e., a single feed forward pass) of a trained convolutional neural network may provide one or more benefits in some implementations, such as benefits related to grasping parameter detection speed (e.g., in some implementations speeds less than 100 milliseconds) and/or computational costs. Some implementations also optionally enable recognition of a class of the object in the same single pass of the convolutional neural network. Also, some implementations optionally enable grasping parameters for multiple "good" grasps to be provided from the single pass of the trained convolutional neural network (along with an associated confidence measure for each).

Figure 2:
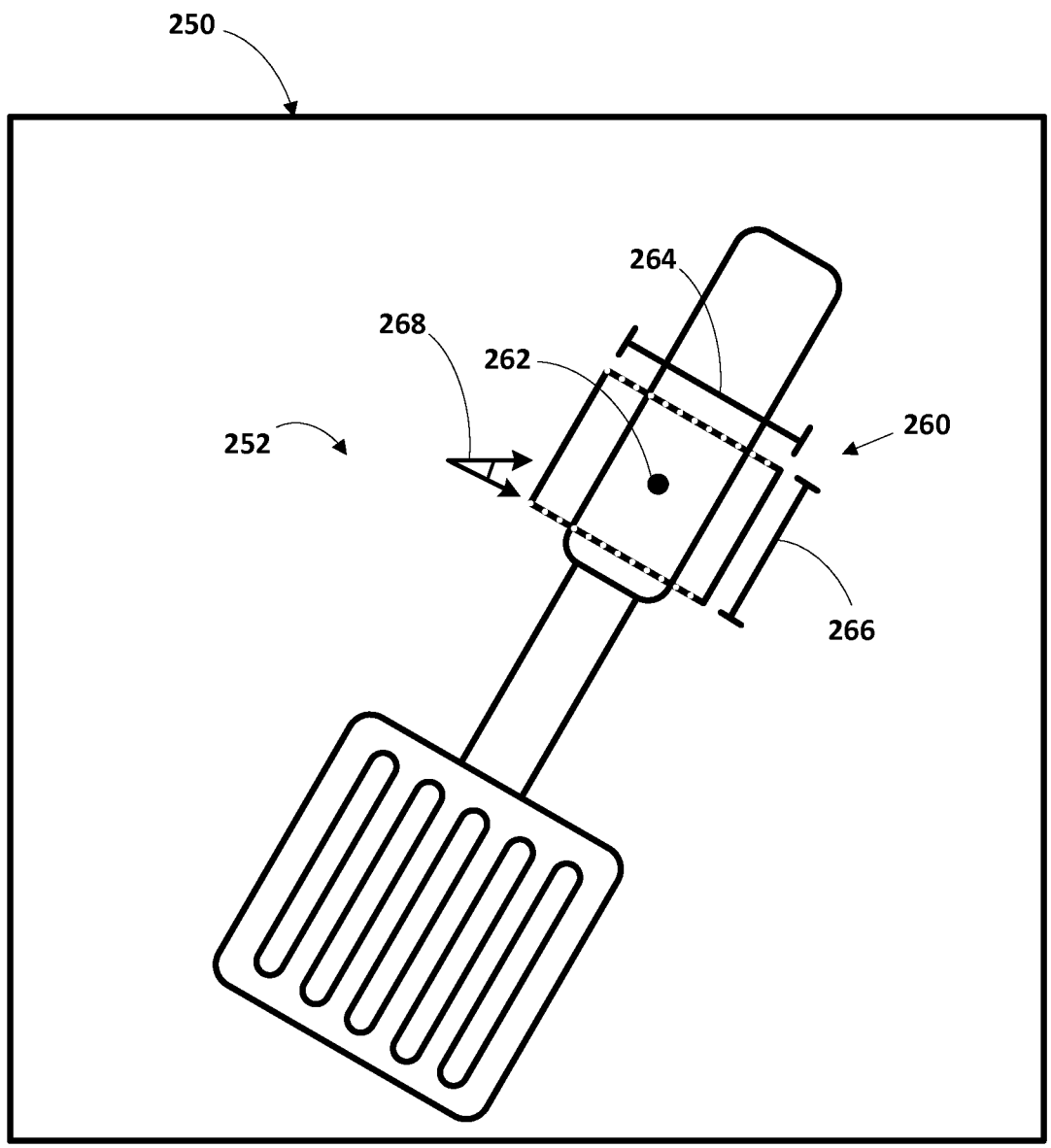
FIG. 2 illustrates an example image of a spatula, with a graphical representation of example grasping parameters for a grasp of the spatula.

With reference to FIG. 2, an example image 250 of a spatula 252 is illustrated. The example image includes a graphical representation 260 of one example of grasping parameters for a grasp of the spatula. The graphical representation 260 is a "grasping rectangle" that defines a grasping coordinate 262, a grasping width 264, a grasping height 266, and an orientation parameter 268 of a robot end effector for the grasp. The grasping coordinate 262 defines a two-dimensional (e.g., "X" and "Y") coordinate that defines a "center" or other reference point of a robot end effector. The grasping width 264 defines a distance between two or more opposing actuable members of the robot end effector, such as a distance between opposing plates of a parallel plate gripper end effector. The grasping height 266 defines a span of each of one or more opposing actuable members of a robot end effector, such as the span of each plate of a parallel plate gripper. It is noted that some robot end effectors may have fixed heights and other end effectors may have adjustable heights (e.g., plates of adjustable sizes). The orientation parameter 268 defines an orientation angle of the end effector for the grasp of the object relative to a reference orientation such as an "X" axis (left to right in FIG. 2) of the image 250. In some implementations, the orientation parameter 268 may comprise two separate parameters to account for the two-fold rotationally symmetric nature of grasp angles. For example, the first parameter may be the sine of twice the orientation angle and the second parameter may be the cosine of twice the orientation angle.

The graphical representations of grasps in FIG. 2 and other figures are provided for ease in explanation. The grasping parameters need not be provided as actual graphical representations for performance of techniques described herein. For example, in some implementations of techniques described herein the grasping parameters may be defined as a vector $<x, y, \sin(2*\theta), \cos(2*\theta), h, w>$, where x defines a first dimension coordinate, y defines a second dimension coordinate, $\theta$ defines an orientation angle, h defines a height, and w defines a width. Moreover, the graphical representation of FIG. 2 is just one example of grasping parameters and additional and/or alternative grasping parameters may be utilized. For example, in some implementations the grasping parameters may define a three-dimensional grasping coordinate instead of a two-dimensional grasping coordinate. Also, for example, in some implementations grasping parameters may define more than one height and/or more than one width (e.g., for plates or other actuable members (e.g., "fingers")) that are actuable to non-parallel relations to one another and/or adjustable in size. Also, for example, in some implementations grasping parameters may include only a two-dimensional or three-dimensional grasping coordinate and an orientation.

Figure 1:
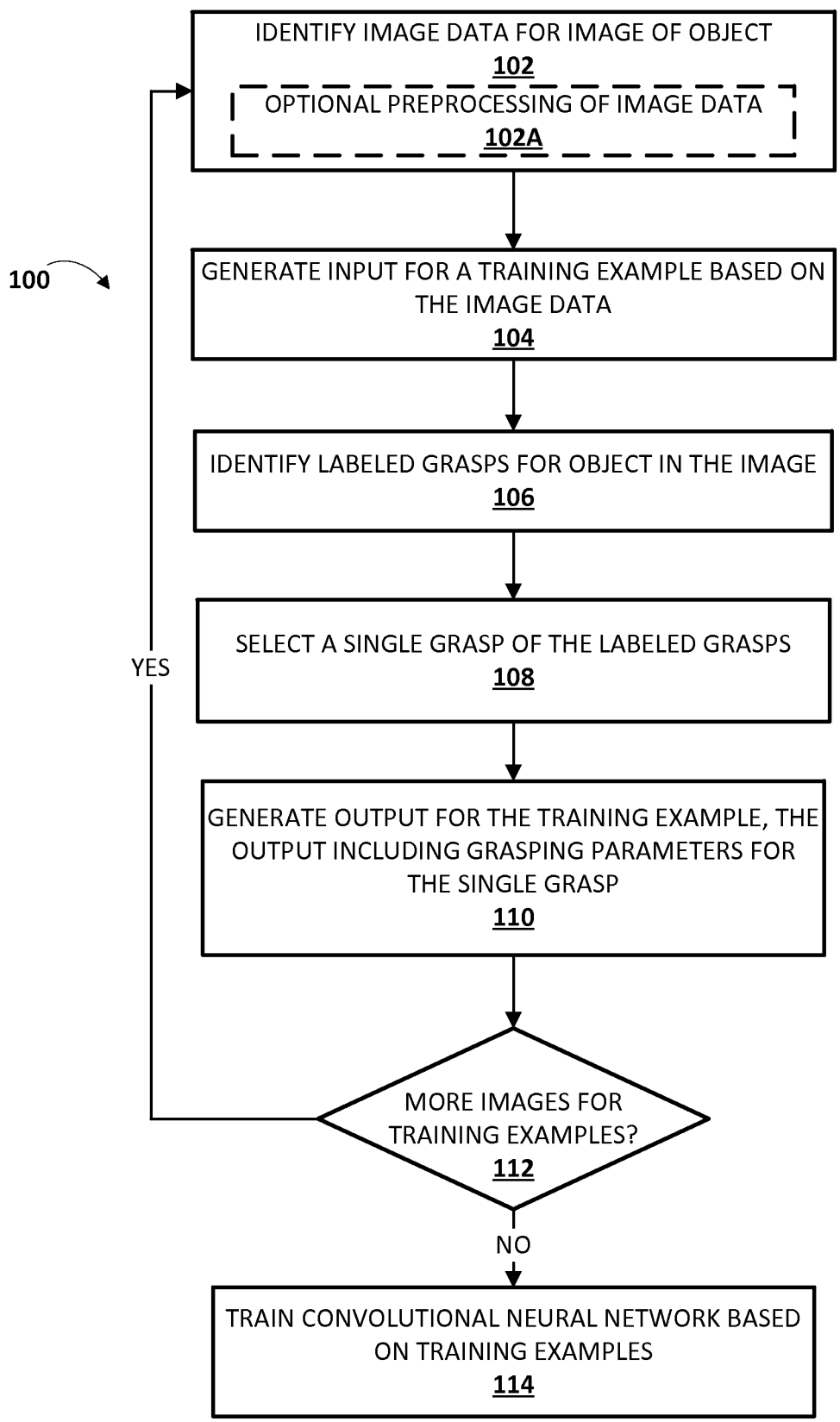
FIG. 1 is a flowchart illustrating an example method of training a convolutional neural network to enable generation of grasping parameters for only a single grasp of an object.

FIG. 1 is a flowchart illustrating an example method 100 of training a convolutional neural network to enable generation of grasping parameters for only a single grasp of an object based on image data for the object. For convenience, the operations of the flow chart are described with reference to a system that performs the operations. This system may include various components of various computer systems, such as training example generation engine 1012 and/or a CPU or GPU operating over convolutional neural network 700 or 1014. Moreover, while operations of method 100 are shown in a particular order, this is not meant to be limiting. One or more operations may be reordered, omitted or added.

Generally, the method 100 may be utilized to train a convolutional neural network to enable prediction of a single grasp of an object based on image data for the object. In the method 100, images that contain only an object and that are annotated with acceptable grasps are utilized. Each training example includes image data for one of the images (training example input) and grasping parameters of a randomly selected labeled grasp that serves as the "ground truth" grasp (training example output) for that training example. As a result of the random selection of a single labeled grasp across multiple images (and multiple rotated and/or translated iterations of the same images) of the training examples, the trained CNN model does not over fit to a single grasp on a given object but, rather, generally fits to the "average" of the possible grasps for the object. Extra output neuron(s) may optionally be added to the training examples to also train the CNN to predict a classification of an object of an image.

At block 102, the system identifies image data for an image of an object. The image data includes one or more channels for the image such as a depth channel, a red channel, a blue channel, and/or a green channel. For example, in some implementations, the image data may include a red channel, a green channel, and a depth channel. Also, for example, in some implementations the image data may include only a single depth channel. Also, for example, in some implementations the image data may include multiple depth channels that collectively represent a multi-dimensional mapping. For instance, in some implementations the image data may include only multiple depth channels that define a multi-dimensional mapping that includes the object. Each channel defines a value for each of a plurality of pixels of the image such as a value from 0 to 255 for each of the pixels of the image. In some implementations, the image data is based on an image from a grasping data set such as a grasping data set that has a plurality of images, each including an object and each associated with labeled "ground truth" grasps for the object. Each labeled ground truth grasp defines grasping parameters for a respective grasp of the object. For example, a labeled ground truth grasp may define a vector $<x, y, \sin(2*\theta), \cos(2*\theta), h, w>$ that defines a "grasping rectangle" for the image, where x and y each define a dimension coordinate of a center of a grasping rectangle relative to the image, $\theta$ defines the orientation of the grasping rectangle, and h and w define respective of height and width of the grasping rectangle.

In some implementations, the grasping data set may include one or more augmented images that build on an original data set and are generated by translating and/or rotating images of the original data set. For example, to generate an augmented image of an original image, the system may take a center crop of 320×320 pixels (or other size) of the original image, randomly translate it by up to 50 pixels (or other size) in both the x and y direction, and rotate it by a random amount. The system may then resize the image to 224×224 pixels (or other size) to fit the input layer of the convolutional neural network. The system may generate multiple augmented images (e.g., more than 1,000 in some implementations) per original image by, for example, iteratively generating the augmented images as previously described.

In some implementations, block 102 includes sub-block 102A, in which the system optionally preprocesses the image data for the image of the object. For example, the system may resize the image to 224×224 pixels (or other size) to fit a defined size of the input layer of the convolutional neural network. In other implementations, the image may already be appropriately sized. Also, for example, where the image data includes multiple color channels (e.g., three) and a depth channel, the system may substitute one of the color channels (e.g., the blue channel) of the image with the depth channel. As described herein, substituting a color channel with a depth channel may, among other things, enable pre-training of the convolutional neural network using image data having three color channels. As yet another example of preprocessing the image data, the system may normalize the values for the depth channel. For instance, the system may normalize the depth values to between 0 and 255, substitute 0 for pixel values that lack depth information, and/or approximately mean-center the depth values for the image (e.g., by globally subtracting a value such as 144). In some instances, normalizing the depth values to between 0 and 255 may occur after first cropping the depth values to be within a defined range such as, for example, a range from 1.0 meter to 1.4 meters (other ranges may be used depending on, for example, the data set).

At block 104, the system generates input for a training example for a convolutional neural network based on the image data. For example, where the image data consists of two color channels and a depth channel for a 224×224 pixel image, that image data may be utilized as input for a training example for the convolutional neural network.

At block 106, labeled grasps are identified for the object in the image. For example, the image may be mapped to, or otherwise associated with, a plurality of labeled "ground truth" grasps for the object that each defines grasping parameters for a respective grasp of the object. For example, each of the labeled ground truth grasps may define a vector $<x, y, \sin(2*\theta), \cos(2*\theta), h, w>$ that defines a "grasping rectangle" for the image as described above. Additional and/or alternative grasping parameters may be utilized in other implementations.

Figure 3:
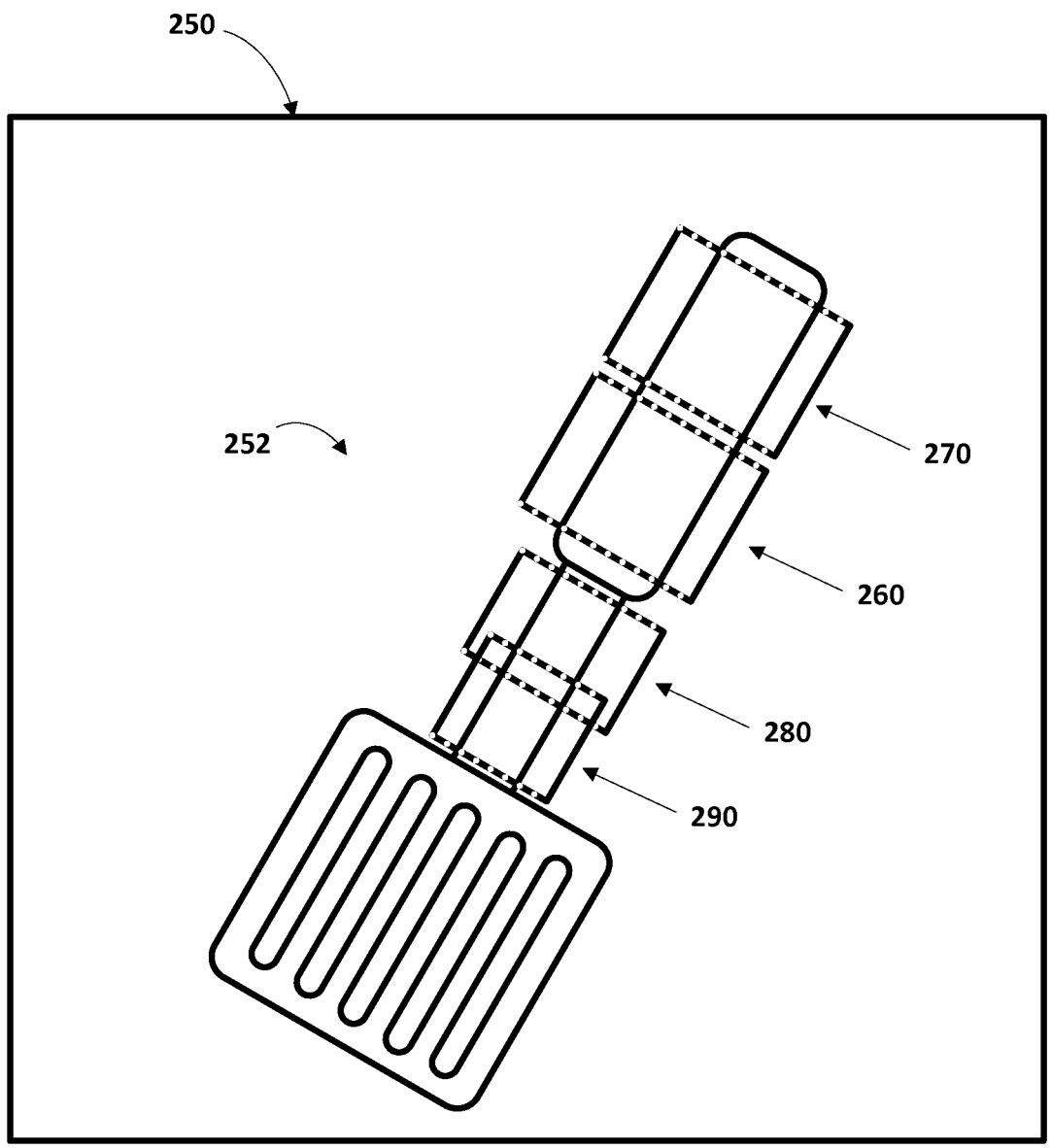
FIG. 3 illustrates the example image of FIG. 2, with graphical representations of grasping parameters for additional grasps of the spatula.

As an example, FIG. 3 illustrates the example image 250 of FIG. 2, with graphical representations of multiple labeled grasps. In particular, FIG. 3 includes the graphical representation 260 of a grasp of FIG. 2 and includes graphical representations 270, 280, and 290 of additional grasps of the spatula 252. For ease in illustration, the graphical representations 260, 270, 280, and 290 of FIG. 3 do not include the more detailed graphical representations for the particular grasping parameters for each of the grasping rectangles. However, the positional coordinates, orientation, width and height of each of the additional grasps can be ascertained by viewing graphical representations 260, 270, 280, and 290. Although FIG. 3 illustrates only four labeled grasps, in many implementations additional labeled grasps may be associated with the image 250.

At block 108, the system selects a single grasp of the labeled grasps. For example, the system may randomly select the grasp represented by graphical representation 260 of FIG. 3. Random selection of one or more grasps as used herein may include truly random selection or pseudo-random selection.

At block 110, the system generates output for the training example. The output for the training example includes one or more grasping parameters for the selected single grasp. For example, in implementations where the grasping parameters are defined as a six value vector $<x, y, \sin(2*\theta), \cos(2*\theta), h, w>$, the output may be six neurons, with each of the neurons defining a respective one of the values of the six value vector. Also, for example, in implementations where the grasping parameters are defined as a three value vector $<x, y, \theta>$, the output may be three neurons, with each of the neurons defining a respective one of the values.

At block 112, the system may determine whether there are more images for training examples. If the answer is yes, method 100 may proceed back to block 102, image data may be identified for another image (such as an image of another object), and blocks 104-110 may be repeated to generate another training example. In some implementations, determining whether there are more images for training examples may include determining whether images remain in the data set that have not yet been utilized by the method 100 to generate a training example. In some implementations, determining whether there are more images for training examples may additionally and/or alternatively include determining whether a threshold number of training examples has already been generated. If the answer at block 112 is no, however, then method 400 may proceed to block 114. In some implementations, block 112 may be omitted or modified. For example, in some implementations one or more generated training examples may be utilized to train the convolutional neural network at block 114 while method 100 is simultaneously being performed one or more times to generate one or more additional training examples for further training of the convolutional neural network.

At block 114, the convolutional neural network is trained based on the training examples. For example, the generated input of block 104 for a given training example and the generated output of block 110 for the given training example may be utilized to train the convolutional neural network. Additional description of example convolutional neural networks and training of such networks is provided herein (e.g., in description related to FIGS. 7 and 10).

In some implementations, extra output neurons may optionally be included in the output of the training examples at block 110 to also train the CNN to predict a classification of an object of an image. For example, the image data of block 102 may also be mapped to, or otherwise associated with, an object category that identifies a category to which the object belongs. Object categories may include, for example, a closed set of categories such as a set that includes categories of "bottle", "shoe", and "sporting equipment." At block 110, the system may generate output that includes an identifier of the category in addition to the grasping parameters for the single grasp. For example, six neurons of the output at block 108 may define grasping parameters and a seventh neuron of the output at block 108 may define the object category. Accordingly, in these implementations the CNN may be trained to predict both the category of an object in an image and grasping parameters for the object in a single pass through the CNN.

Figure 4:
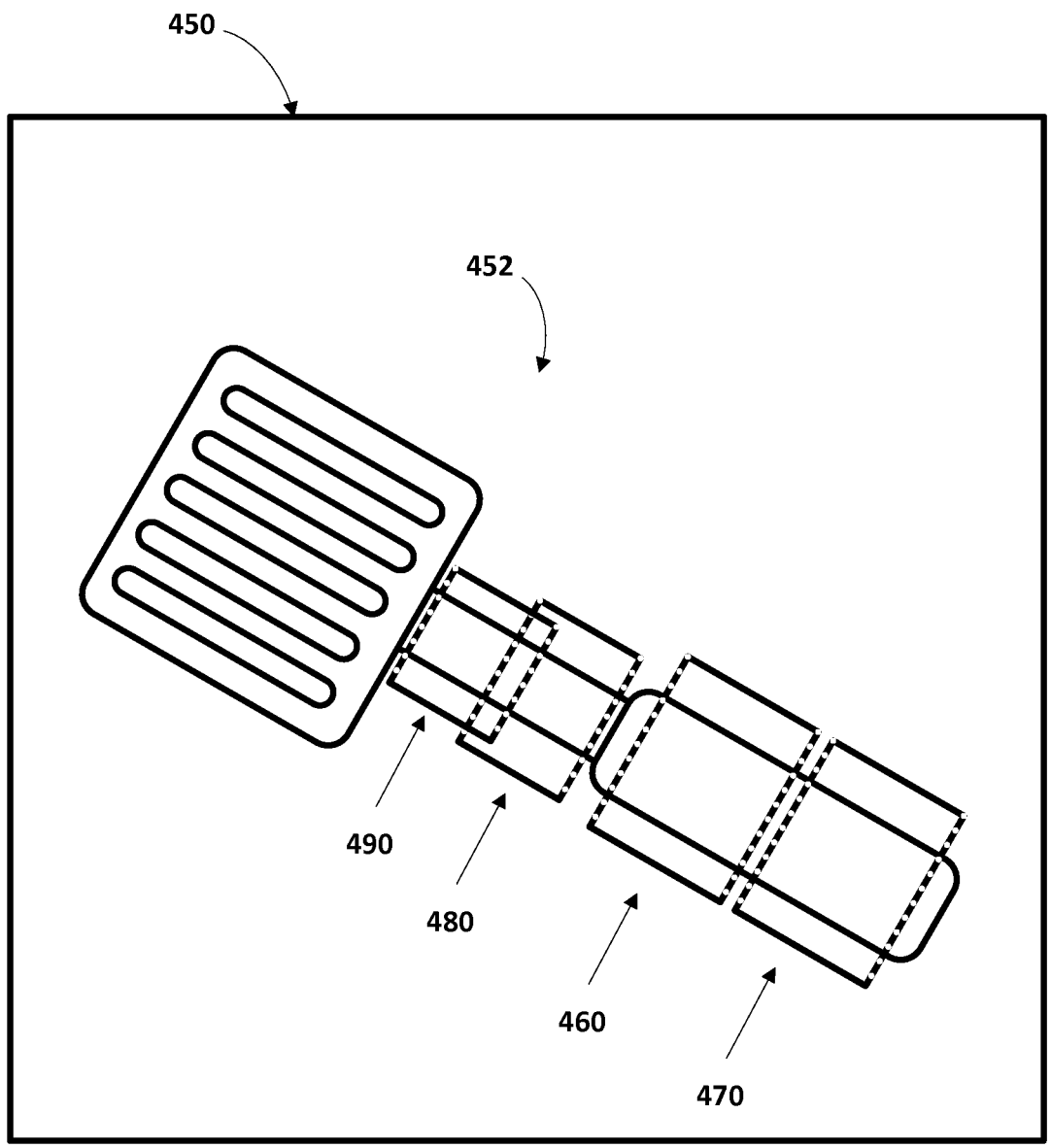
FIG. 4 illustrates another example image of a spatula with graphical representations of grasping parameters; the example image of FIG. 4 is generated based on rotation and translation of an image utilized to generate the example image of FIG. 3.

Subsequent iterations of the method 100 may identify a new image at block 102 for use in generating an additional training example. For example, the new image may be an image of a new object, such as an image of a disc, a bowl, or a banana. Also, for example, the new image may be a translated and/or rotated version of the image utilized to generate the image of one or more previous iterations of the method 100. For example, FIG. 4 illustrates another example image 450 of a spatula 452 with graphical representations 460, 470, 480, and 490 of grasping parameters. The example image 450 of FIG. 4 is generated based on rotation and translation of an image utilized to generate the example image 250 of FIG. 3. The graphical representations 460, 470, 480, and 490 are in the same location relative to spatula 452 as they are in the example image 250 of FIG. 3, but are in different locations relative to the image 450 than they are in the example image 250 of FIG. 3. The labeled grasps for the image 450 may be generated, for example, by maintaining the height and width grasping parameters, but altering the positional coordinates consistent with the translation utilized to generate the image 450 and altering the orientation consistent with the rotation utilized to generate the image 450.

Figure 5:
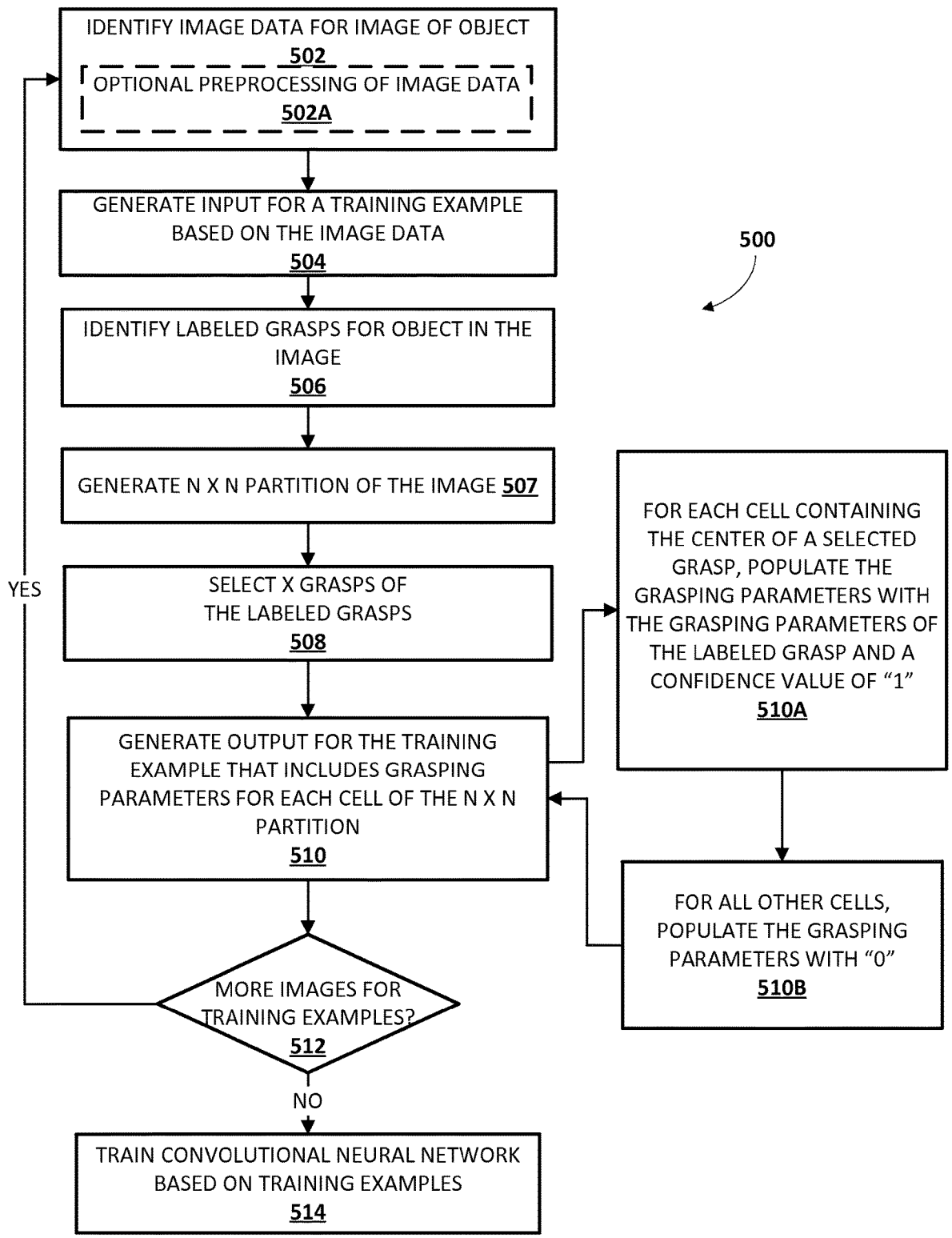
FIG. 5 is a flowchart illustrating an example method of training a convolutional neural network to enable generation of grasping parameters for each of a plurality of grasps of an object.

FIG. 5 is a flowchart illustrating an example method 500 of training a convolutional neural network to enable generation of grasping parameters for each of a plurality of grasps of an object based on image data for the object. For convenience, the operations of the flow chart are described with reference to a system that performs the operations. This system may include various components of various computer systems, such as training example generation engine 1012 and/or a CPU or GPU operating over convolutional neural network 700 or 1014. Moreover, while operations of method 500 are shown in a particular order, this is not meant to be limiting. One or more operations may be reordered, omitted or added.

Generally, the method 500 may be utilized to train a convolutional neural network to predict multiple grasps, along with confidence measures for those grasps. As with method 100, method 500 utilizes images that contain only an object and that are associated with acceptable grasps. In method 500, each training example includes image data for one of the images (training example input). In determining the output of the training example, the system generates an N×N partition of the image, such as a 7×7 grid of cells. A plurality of acceptable grasps are randomly selected to serve as ground truth grasps for the training example. Each training example has output that contains, for each cell of the N×N partition, a confidence value for the cell and the remaining grasping parameters for the cell. The confidence values for the cells that contain the center of the randomly selected ground truth grasps are marked with ones (or other value to signify "contains" grasps) and the remaining parameters for those cells are populated with the respective grasping parameters. The values for the parameters of the remaining cells are marked with zeros (or other value to signify "does not contain" grasps). Error may optionally be backpropagated during training for those cells that contain acceptable grasps but were not in the random selection. Accordingly, following training, output based on the CNN may provide, for each of the cells of an input image, a confidence value indicating the likelihood the cell contains a valid grasp (based on the confidence measures of the training examples) and other grasp parameters for a grasp in that cell (e.g., positional coordinates, orientation). The grasp parameters from the grid with the greatest likelihood of containing a valid grasp may be selected (and optionally one or more of the "next best" as backups) for use by a control system of a robot in positioning a grasping end effector. Extra output neuron(s) may optionally be added to the training examples to also train the CNN to predict a classification of an object of an image.

At block 502, the system identifies image data for an image of an object. The image data includes one or more channels for the image such as a depth channel, a red channel, a blue channel, and/or a green channel. In some implementations, the image data is based on an image from a grasping data set such as a grasping data set that has a plurality of images, each including an object and each associated with labeled "ground truth" grasps for the object. Block 502 of method 500 and block 102 of method 100 may have one or more aspects in common.

In some implementations, block 502 includes sub-block 502A, in which the system optionally preprocesses the image data for the image of the object. For example, the system may resize the image to fit the input layer of the convolutional neural network. In other implementations, the image may already be appropriately sized. Also, for example, where the image data includes multiple color channels (e.g., three) and a depth channel, the system may substitute one of the color channels (e.g., the blue channel) of the image with the depth channel. As yet another example of preprocessing the image data, the system may normalize the values for the depth channel. Sub-block 502A of method 500 and sub-block 102A of method 100 may have one or more aspects in common.

At block 504, the system generates input for a training example for a convolutional neural network based on the image data. For example, where the image data consists of two color channels and a depth channel for a 224×224 pixel image, that image data may be utilized as input for a training example for the convolutional neural network. Block 504 of method 500 and block 104 of method 100 may have one or more aspects in common.

At block 506, labeled grasps are identified for the object in the image. For example, the image may be mapped to, or otherwise associated with, a plurality of labeled "ground truth" grasps for the object that each defines grasping parameters for a respective grasp of the object. Block 506 of method 500 and block 106 of method 100 may have one or more aspects in common.

Figure 6:
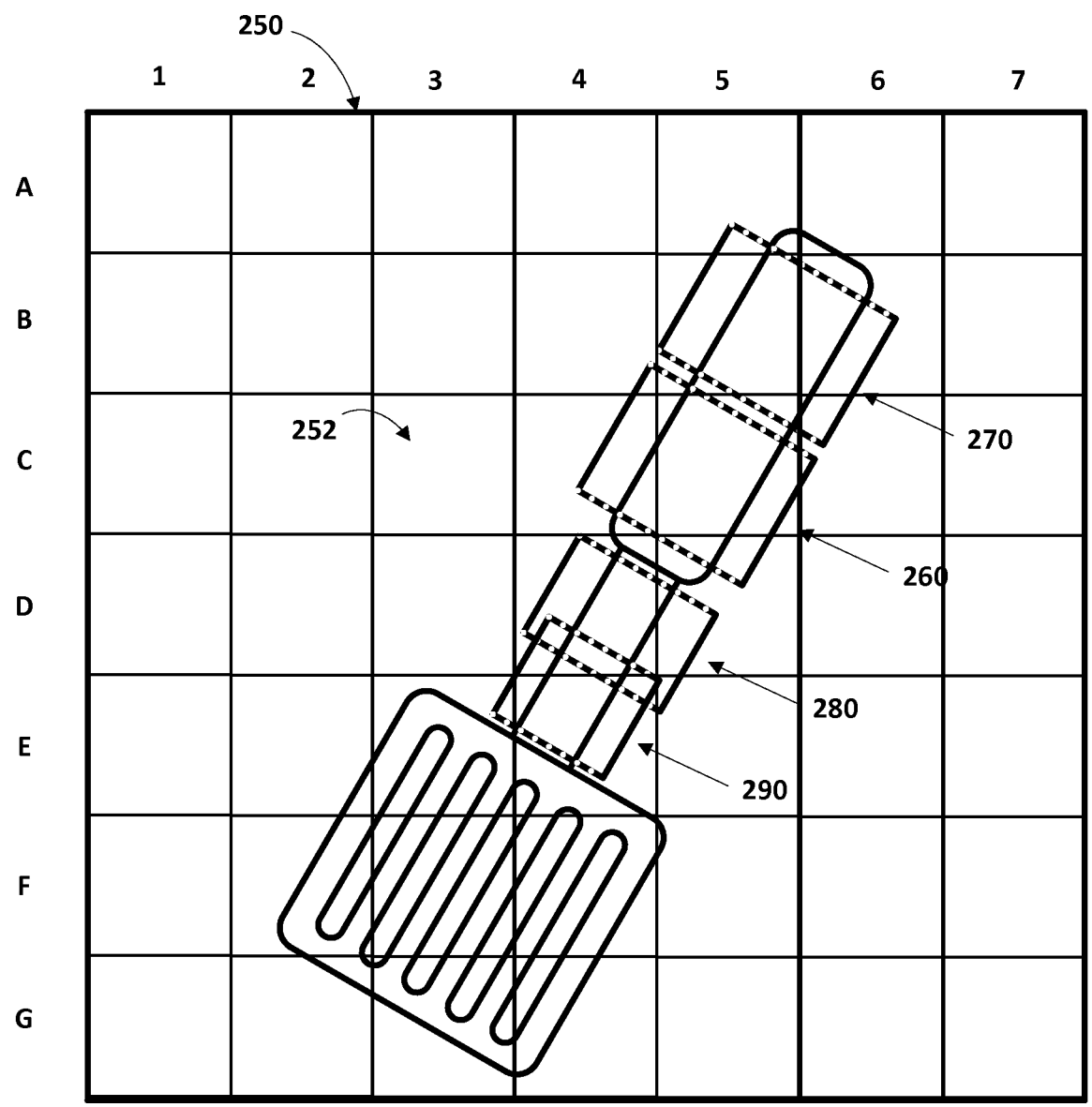
FIG. 6 illustrates the example image of a spatula of FIG. 3, with graphical representations of cells of a seven by seven grid partition of the image.

At block 507, the system generates an N×N partition of the image. For example, the system may generate an N×N grid or other partition of the image to subdivide the image into a plurality of cells. As an example, FIG. 6 illustrates the example image 250 of FIG. 3, with graphical representations of forty-nine cells of a seven by seven grid partition of the image. The rows of the partition are labeled A-G and the columns of the petition are labeled 1-7. Grid partitions of other sizes or other non-grid partitions may be utilized. The graphical representation of the partition of FIG. 6 is provided for ease in explanation and the partition need not be generated as an actual graphical representation for performance of techniques described herein. For example, in some implementations the cells of the partition may be defined base on the pixel values of the image that define the cells, such as pixel values that are contained in the cells.

At block 508, the system selects X grasps of the labeled grasps identified at block 506. For example, the system may randomly select the grasps represented by graphical representations 260, 270, and 290. X is an integer greater than one and may be selected based on various considerations. For example, X may be two, three, four, five, six, or other integer. In some implementations, X is an integer that is less than the number of labeled grasps identified at step 506. In some implementations, X is fixed throughout a plurality (e.g., all) iterations of the method 500.

At block 510, the system generates output for the training example. The output for the training example includes grasping parameters for each cell of the N×N partition. Block 510 includes sub blocks 510A and 510B. At block 510A the system, for each cell containing the center of a selected grasp, populates the grasping parameters for that cell with the grasping parameters of the respective selected grasp and with a confidence value of 1 (or other "contains" value). The system may determine a cell contains the center of a selected grasp based on determining the grasping coordinate (e.g., the center) of the grasp falls within the cell. At block 510B the system, for all other cells, populates the grasping parameters with zero (or other "null" value).

As one specific example of block 510, assume at block 507 the system generated the seven by seven partition represented in FIG. 6 and that block 508 that the system randomly selected the grasps represented by graphical representations 260, 270, and 290 of FIG. 6. Cell C5 of FIG. 6 contains the center of the grasp represented by graphical representation 260, cell B5 contains the center of the grasp represented by graphical representation 270, and cell E4 contains the center of the grasp represented by graphical representation 290.

At block 510A, the system may populate the grasping parameters for cell C5 with the grasping parameters of the grasp represented by graphical representation 260, populate the grasping parameters for cell B5 with the grasping parameters of the grasp represented by graphical representation 270, and populate cell E4 with the grasping parameters of the grasp represented by graphical representation 290. The system may further assign a value of "1" (or other "contains" value) to the confidence measures of the grasping parameters for each of the cells C5, B5, and E4.

At block 510B, the system may populate the grasping parameters for each of the remaining cells with zero. Accordingly, the number of neurons in the output of this training example will be forty nine (the number of cells in the partition) times the number of grasping parameters (including the confidence measures). For example, the number of neurons would be 343 assuming seven grasping parameters (e.g., a first positional coordinate, a second positional coordinate, a first orientation parameter, a second orientation parameter, a width, a height, and a confidence measure).

At block 512, the system may determine whether there are more images for training examples. If the answer is yes, method 500 may proceed back to block 502, image data may be identified for another image (such as an image of another object), and blocks 504-510 may be repeated to generate another training example. If the answer at block 512 is no, however, then method 500 may proceed to block 514. Block 512 of method 500 and block 112 of method 100 may have one or more aspects in common.

In some implementations, block 512 may be omitted or modified. For example, in some implementations one or more generated training examples may be utilized to train the convolutional neural network at block 514 while method 500 is simultaneously being performed one or more times to generate one or more additional training examples for further training of the convolutional neural network.

At block 514, the convolutional neural network is trained based on the training examples. For example, the generated input of block 504 for a given training example and the generated output of block 510 for the given training example may be utilized to train the convolutional neural network. Additional description of example convolutional neural networks and training of such networks is provided herein (e.g., in description related to FIGS. 7 and 10).

In some implementations, extra output neurons may optionally be added to the training examples at block 510 to also train the CNN to predict a classification of an object of an image. For example, the image data of block 502 may also be mapped to, or otherwise associated with, an object category that identifies a category to which the object belongs. At block 510, the system may generate output that includes an identifier of the category in addition to the grasping parameters for the single grasp. Accordingly, in those implementations the CNN may be trained to predict both the category of an object in an image and grasping parameters for the object in a single pass through the CNN.

Subsequent iterations of the method 500 may identify a new image at block 502 for use in generating an additional training example. For example, the new image may be an image of a new object or a translated and/or rotated version of an image utilized in a previous iteration of the method 500.

It is noted that the "multiple grasps" technique of the method of 500 shares some similarities with the "single grasp" technique of method 100, but each cell is in essence treated as a single image. Accordingly, the "averaging" of the possible grasps is averaged in a smaller area than the averaging in the single grasp technique, which may result in less erroneous grasping parameters for certain objects. For example, using the single grasp technique that sees the whole image as a grid may result in an "average" grasp for a bowl being in the center of the bowl, whereas the multiple grasp technique will look at smaller cells and may result in an "average" grasp for a cell that is on the perimeter of the bowl.

Figure 7:
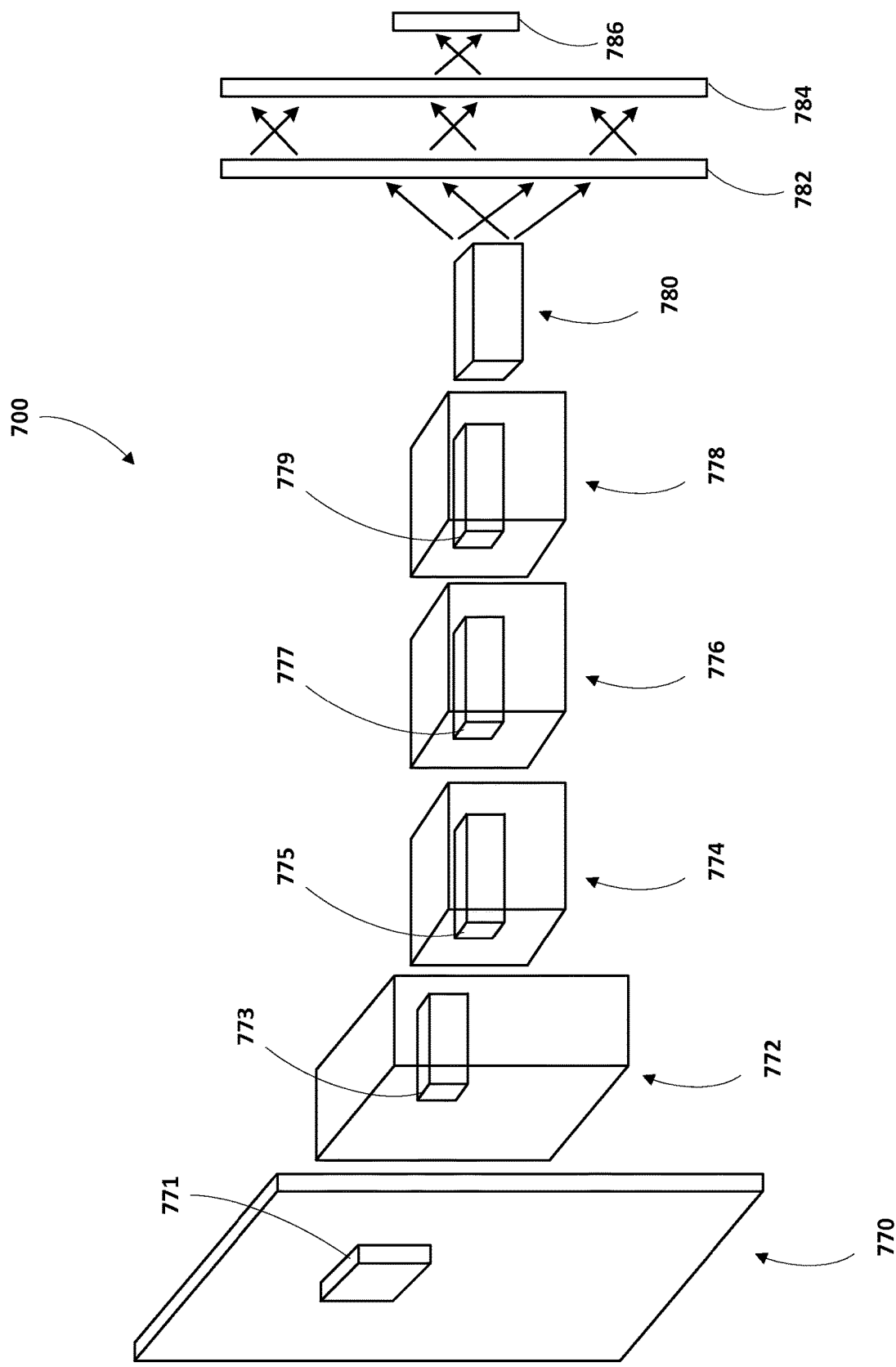
FIG. 7 illustrates an example architecture of a convolutional neural network of various implementations.

FIG. 7 illustrates an example architecture of a convolutional neural network 700 of various implementations. The CNN 700 of FIG. 7 is an example of a CNN that may be trained based on the methods of FIG. 1 or FIG. 5. The CNN 700 of FIG. 7 is further an example of a CNN that, once trained, may be utilized to generate grasping parameters based on the method of FIG. 8. Generally, a convolutional neural network is a multilayer learning framework that includes an input layer, one or more convolutional layers, optional weight and/or other layers, and an output layer. During training, a convolutional neural network is trained to learn a hierarchy of feature representations. Convolutional layers of the network are convolved with filters and optionally down-sampled by pooling operations. Generally, the pooling operations aggregate values in a smaller region by one or more downsampling functions such as max, min, and/or normalization sampling.

The CNN 700 includes an input layer 770 that has a size of X, by Y, by Z. When used in describing the size of layers of the CNN 700, X will refer to the portion of a respective layer extending generally "into" and "out of" the sheet of FIG. 7 (when viewed in landscape), Y will refer to the portion of a respective layer extending "up" and "down" the sheet of FIG. 7 (when viewed in landscape), and Z will refer to the portion of a respective layer extending "left" and "right" in the sheet of FIG. 7 (when viewed in landscape; i.e., the "thinnest" dimension of input layer 770). For example, the size of the input layer 770 may be 224 pixels, by 224 pixels, by 3 channels (e.g., the 3 channels may be depth channel, first color channel, second color channel). Other sizes may be used such as different pixel sizes or more or fewer channels.

A convolution 771 is illustrated on a portion of the input layer 770 and represents a convolution that can be taken over the entire image data provided to the input layer 770 to convolve the image data to a convolutional layer 772. The convolution 771 may be, for example, a five by five convolution. The weights of the convolution 771 are learned during training of the CNN 700 based on multiple training examples. The convolution 771 may optionally include pooling and/or normalization.

The convolutional layer 772 has a size of X, by Y, by Z. The size is smaller in the "X" and "Y" dimension than the size of input layer 770 and is larger in the "Z" dimension than the input layer 770. The larger Z dimension represents filters that may be learned during training of the CNN 700. As one example, the size of the convolutional layer 772 may be 56, by 56, by 64.

A convolution 773 is illustrated on a portion of the layer 772 and represents a convolution that can be taken over the entire layer 772 to convolve to convolutional layer 774. The convolution 773 may be, for example, a three by three convolution. The weights of the convolution 773 are learned during training of the CNN 700 based on multiple training examples. The convolution 773 may optionally include pooling and/or normalization.

The convolutional layer 774 has a size of X, by Y, by Z. The size is smaller in the "X" and "Y" dimension than the size of convolutional layer 772 and is larger in the "Z" dimension than the convolutional layer 772. The larger Z dimension represents filters that may be learned during training of the CNN 700. As one example, the size of the convolutional layer 774 may be 14, by 14, by 128.

A convolution 775 is illustrated on a portion of the layer 774 and represents a convolution that can be taken over the entire layer 774 to convolve to convolutional layer 776. The convolution 775 may be, for example, a three by three convolution. The weights of the convolution 775 are learned during training of the CNN 700 based on multiple training examples. The convolution 775 may optionally include normalization.

Convolutional layers 776 and 778 are the same size as the convolutional layer 774. Convolutions 777 and 779 are illustrated on respective of the layers 776 and 778 and represent convolutions that can be taken over the respective layers 776 and 778 and learned during training of the CNN 700. In some implementations, the convolutions 777 and 779 do not include pooling and/or normalization.

The convolution 779 over the convolutional layer 778 results in a final convolutional layer 780. The final convolutional layer 780 has a size of X, by Y, by Z. The size is smaller in the "X" and "Y" dimension than the size of convolutional layers 774, 776, and 778 and is larger in the "Z" dimension than the convolutional layers 774, 776, and 778. The larger Z dimension represents filters that may be learned during training of the CNN 700. As one example, the size of the final convolutional layer 780 may be 7, by 7, by 256.

The final convolutional layer 780 is fully connected to a first weight layer 782 which, in turn, is fully connected to a second weight layer 784. The weight layers 782 and 784 may be vectors, such as vectors of size 512. The second weight layer 784 is fully connected to the output layer 786. The number of neurons in the output layer 786 will depend on, for example, whether method 100 or 500 is employed in training the CNN 700, the number of grasping parameters defined for grasp(s) in output of the training examples, and whether an object classification is included in output of the training examples. For example, with the method 100 of FIG. 1, the number of neurons in the output layer 786 may be equal to the number of grasping parameters provided as training example output (assuming no object classification). For instance, where six grasping parameters are utilized, the output layer 786 may consist of six neurons. Also, for example, with the method 500 of FIG. 5, the number of neurons in the output layer 786 may be equal to the number of cells (block 510) times the number of grasping parameters for each cell in the training example output (assuming no object classification).

In some implementations of training the CNN 700, it is trained for 25 epochs using a learning rate of 0.0005 across all layers and a weight decay of 0.001. In some implementations, a dropout with a probability of 0.5 is added as a form of regularization for the hidden layers between the fully connected layers 780, 782, 784, and 786. In some implementations, other values for epochs, learning rate, weight decay, dropout probability, and/or other parameters may be utilized. In some implementations, a GPU may be utilized for training and/or utilizing the CNN 700. Although a particular convolutional neural network 700 is illustrated in FIG. 7, variations are possible. For example, more or fewer convolutional layers may be provided, one or more layers may be different sizes than the illustrated sizes, etc.

In some implementations, at least portions of the CNN 700 may be pre-trained based on a plurality of images that include one or more color channels, but that omit a depth channel. In some of those implementations, pre-training may improve training time and/or help avoid over fitting during training. As one example of pre-training, portions of the CNN 700 may be pre-trained for an ImageNet classification task using three color channel images. In some of those implementations, the training examples generated for subsequent training of the CNN 700 may include input that replaces one of three color channels of an image with a depth channel as described herein.

In some implementations of training the CNN 700 based on the method 500 of FIG. 5, defining null values for the cells not containing the center of a selected grasp (e.g., block 510B) may enable more efficient training of the CNN 700 than if other values were utilized. In some of those implementations, error is backpropagated for one or more cells with null values during training. For example, error may be backpropagated for at least those cells that include the center coordinate of at least one of the valid labeled grasps (block 506) but that are not cells that contain one of the randomly selected grasps (block 508/510A).

Once a CNN is trained according to techniques described herein, it may be utilized to generate grasping parameters for an object based on image data for the object. As described, in some implementations the CNN may be trained to enable generation of grasping parameters in a single regression through the CNN.

Figure 8:
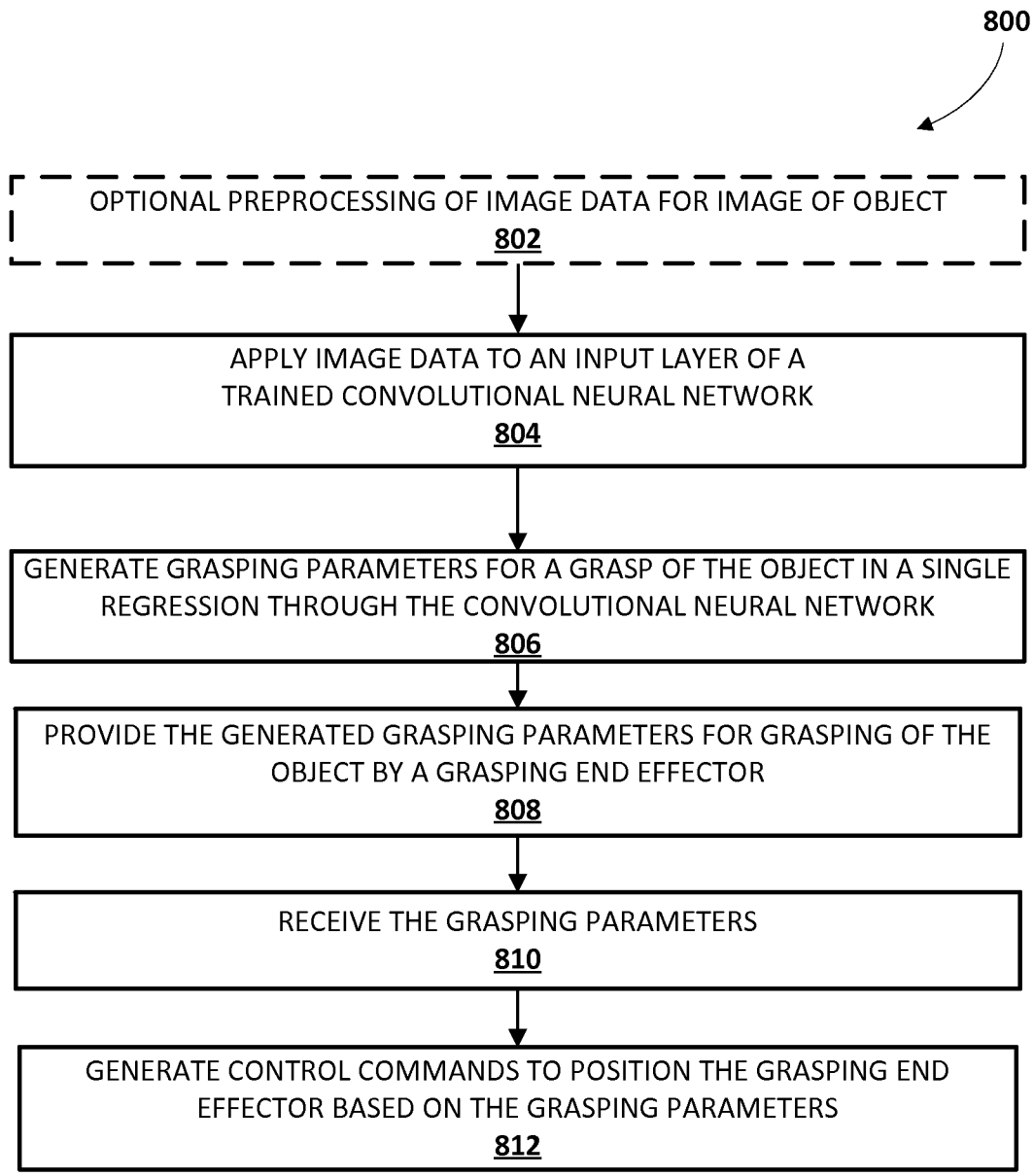
FIG. 8 is a flowchart illustrating an example method of using a trained convolutional neural network to generate grasping parameters for an object based on image data for the object.
Figure 9:
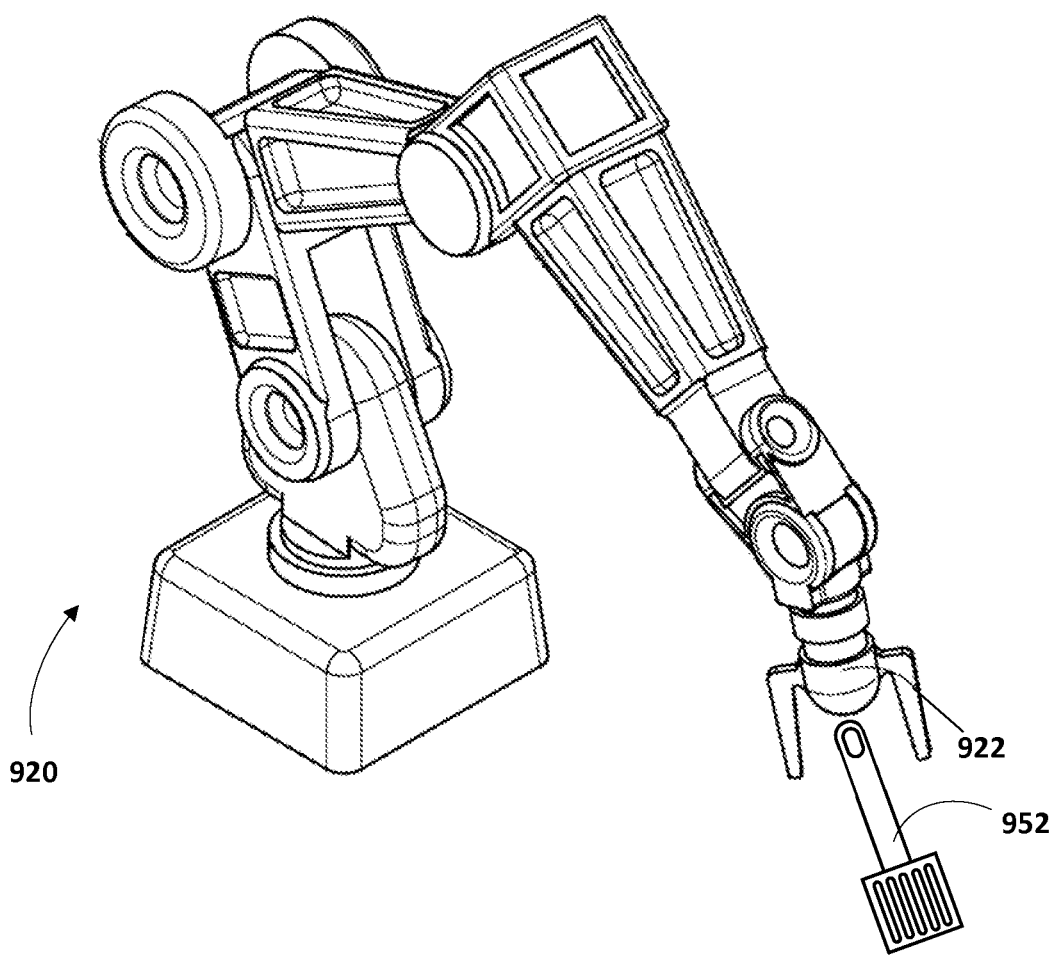
FIG. 9 illustrates an example robot that has utilized grasping parameters in positioning a grasping end effector of the robot relative to a spatula.

FIG. 8 is a flowchart illustrating an example method of using a trained convolutional neural network to generate grasping parameters for an object based on image data for the object. For convenience, the operations of the flow chart are described with reference to a system that performs the operations. This system may include various components of various computer systems, such as a CPU or GPU operating over convolutional neural network 700 or 1014. The CPU or GPU may be, for example, part of computing device 1010 (FIG. 10), robot 1020 (FIG. 10), or robot 920 (FIG. 9). Moreover, while operations of method 800 are shown in a particular order, this is not meant to be limiting. One or more operations may be reordered, omitted or added.

At block 802, the system performs optional preprocessing of image data for an image of an object, such as an image captured by a camera of a robot or a camera viewing an environment of a robot. For example, the system may segment an image captured by a robot to identify a portion of the image that contains fewer objects than the originally captured image. For instance, the system may segment the originally captured image to identify a segment that includes only a single object, and utilize image data for that segment of the image. As another example, the system may resize the image or the segment of the image to match the size of an input layer of a convolutional neural network.

Also, for example, where the image includes a depth channel and a plurality of color channels, the system may replace one of the color channels with the depth channel. For instance, if the image contains a depth channel and blue, red, and green color channels, the system may replace the blue channel with the depth channel to generate image data that includes only three channels (depth, red, green).

At block 804, the system applies image data to an input layer of a trained convolutional neural network. For example, the system may apply the image data to input layer 770 of CNN 700 after the CNN 700 has been trained based on the method 100 or the method 500.

At block 806, the system generates grasping parameters for a grasp of the object in a single regression through the convolutional neural network. For example, the system may regress through the multiple layers of CNN 700 by applying the filtering and/or pooling of the multiple layers in view of the image data applied to the input layer to generate values for the output layer that are particularized to the image data. As described herein, the values of the output layer may correspond to grasping parameters for one or more grasps of the object and, optionally, to a classification of the object.

At block 808, the system provides generated grasping parameters for grasping of the object by a grasping end effector. For example, where grasping parameters for a single grasp are generated at block 806 (e.g., the CNN is one trained based on method 100), the single grasp may be provided. Also, for example, where grasping parameters for multiple grasps are generated at block 806 (e.g., the CNN is one trained based on method 500), the grasping parameters with the confidence measure most indicative of a valid grasp may be provided, optionally with one or more back-up grasps that include confidence measure(s) next most indicative of a valid grasp. In implementations where the values of the output layer also indicate a classification of the object, the indication may also be provided at block 808.

At block 810, the system receives the provided grasping parameters. For example, an operational component that is the same and/or a different operational component than that which performed block 808 may receive the provided grasping parameters. For instance, a control system of a robot of the system may receive the provided grasping parameters from another component of the robot and/or a component of another apparatus of the system.

At block 812, the system generates control commands to position the grasping end effector based on the grasping parameters. For example, where the grasping parameters are a vector of <x, y, sin(2*θ),cos(2*θ), h, w>, the system may generate a path based on "x" and "y" to move the grasping end effector along the path from a current position to a position determined based on "x" and "y". For example, the system may utilize a depth sensor to determine a "z" or depth coordinate at position "x" and "y" and utilize a path planner to determine a path to traverse the end effector to a position of <x, y, z>. Also, for example, the system may generate control commands based on "sin(2*θ)" and "cos (2*θ)", where the control commands are provided to one or more actuators of the robot (before, after, and/or during the path traversal) to adjust the orientation of the grasping end effector based on "sin(2*θ)" and "cos(2*θ)". Also, for example, the system may generate control commands based on "h" and/or "w" to send to one or more actuators of the end effector to adjust the height and/or width of the end effector (before, after, and/or during the path traversal).

In some implementations where grasping parameters for multiple grasps are generated at block 806 (e.g., the CNN is one trained based on method 500), the system may utilize one or more back-up grasps to position the grasping end effector based on the back-up grasping parameters of the one or more back-up grasps. For example, if the system detects a failed grasp of the object using the grasping parameters, the system may generate further control commands to position the grasping end effector based on the additional grasping parameters of a back-up grasp. The system may detect a failed grasp utilizing, for example, a camera of the system (e.g., to determine the end effector is not grasping the object), feedback from one or more torque or weight sensors (e.g., to determine lack of extra weight being added to the robot due to the failed grasp), etc.

In some implementations where a classification category of the object is generated in the single regression through the convolutional neural network, the system may optionally utilize the classification category in generating one or more control commands, such as grasping control commands. For example, in some implementations, the classification may be utilized to generate an additional grasping parameter, such as a grasping strength. For instance, an object classified as "breakable" or "delicate" (or belonging to another category that is associated with breakable or delicate objects) may be grasped with less strength than an object not classified as "breakable" or "delicate". Also, for example, an object belonging to a classification associated with "heavy" objects may be grasped with more strength than an object belonging to a classification associated with "light" objects.

FIG. 9 illustrates an example robot 920 that has utilized grasping parameters in positioning a grasping end effector 922 of the robot 920 relative to a spatula 952. Robot 920 is a "robot arm" having multiple degrees of freedom to enable traversal of grasping end effector 922 along any of a plurality of paths to position the grasping end effector in a desired location. Robot 920 further controls the two opposed "claws" of grasping end effector 922 to actuate the claws between at least an open position and a closed position (and optionally a plurality of "partially closed" positions). In FIG. 9, a control system of robot 920 has positioned the grasping end effector 922 relative to spatula 952 based on grasping parameters generated according to techniques described herein. In some implementations, the robot 920 may include a depth camera to capture an image of the spatula 952 and the grasping parameters generated based on image data of the captured image. In some implementations, the depth camera may be provided in the environment of FIG. 9, but separate from the robot 920.

The control system may further provide control commands to cause an actuator of the grasping end effector 922 to close (e.g., until a sensor of the end effector measures X force) and thereby grasp the spatula 952. The control system may then provide control commands to additional actuators of the robot to move the grasping end effector 922 (and the grasped spatula 952) along one or more paths. Although a particular robot 920 is illustrated in FIG. 9, other robots having one or more grasping end effectors may utilize grasping parameters generated based on techniques described herein, including robots having other robot arm forms, a humanoid form, an animal form, a wheeled device, a submersible vehicle, an unmanned aerial vehicle ("UAV"), and so forth.

Figure 10:
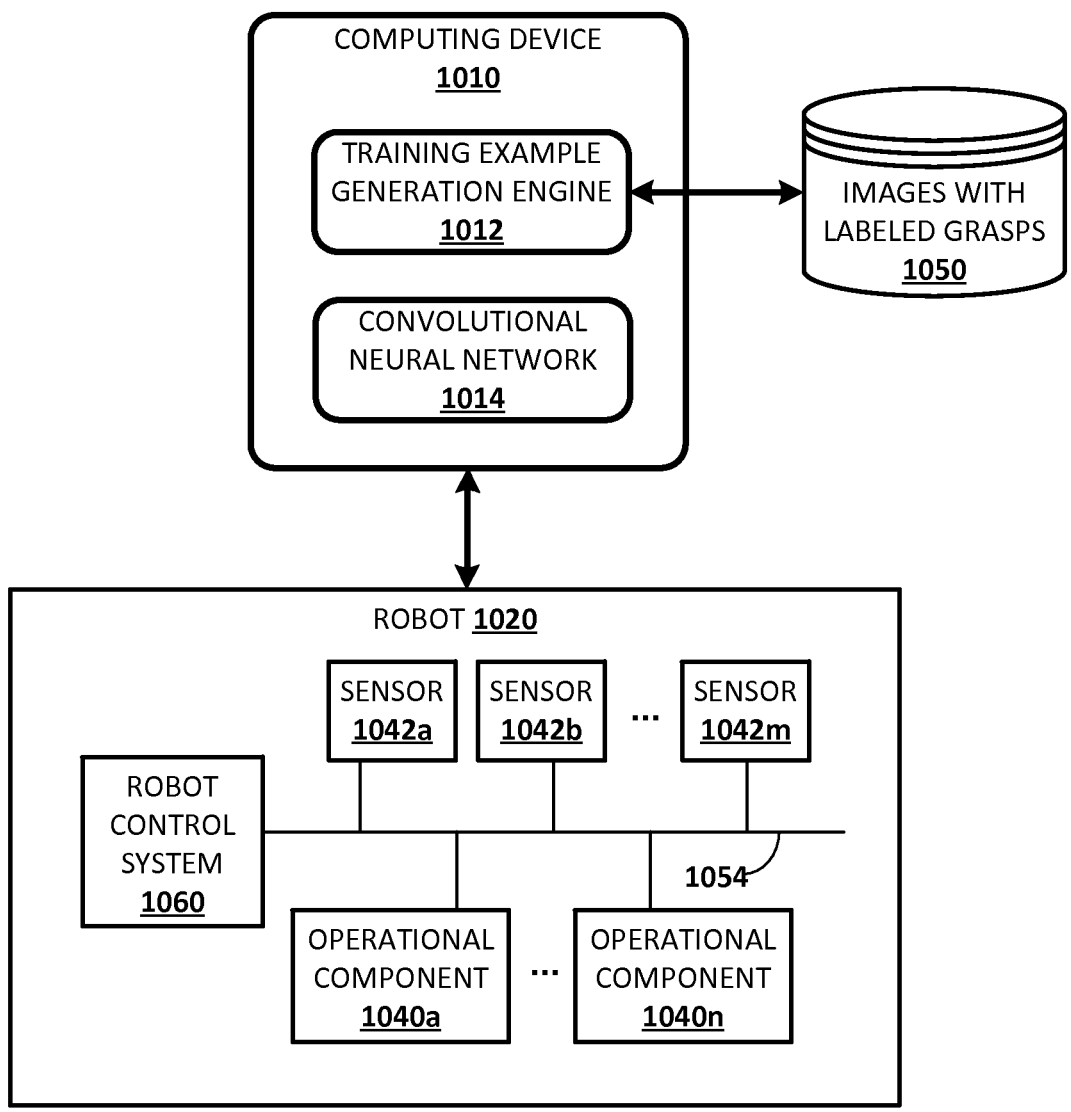
FIG. 10 illustrates an example environment in which disclosed techniques may be implemented.

FIG. 10 illustrates an example environment in which disclosed techniques may be implemented. The example environment includes a computing device 1010 that includes a training example generation engine 1012 and a convolutional neural network 1014. The computing device 1010 may be, for example, a desktop computing device or a server and may include one or more components not explicitly illustrated in FIG. 10 such as a CPU and/or GPU, memory, etc. In some implementations, the computing device 1010 may share one or more aspects in common with the example computing device 1110 illustrated in FIG. 11 and described in more detail herein. In some implementations, the computing device 1010 may include multiple computing devices in communication with one another.

The training example generation engine 1012 is in communication with images with labeled grasps database 1050. The images with labeled grasps database 1050 includes one or more storage mediums storing a plurality of images of objects and labeled grasps mapped or otherwise associated with the images. The images with labeled grasps database 1050 may include images from a provided data set and/or one or more augmented images that build on an original data set and are generated by translating and/or rotating images of the original data set. The training example generation engine 1012 generates training examples for training of the convolutional neural network. The training example generation engine 1012 may generate the training examples utilizing one or more techniques described herein, such as techniques based on blocks 102-112 of FIG. 1 and/or blocks 502-512 of FIG. 5. The computing device 1010 utilizes training examples generated by the training example generation engine 1012 to train the convolutional neural network 1014. In other implementations, a processor of the robot 1020 and/or other component may train the convolutional neural network 1014 based on the training examples.

The computing device 1010 is in communication with robot 1020. The computing device 1010 may be in communication with the robot 1020 via a direct communication line or through one or more networks such as a local area network (LAN) or wide area network (WAN) (e.g., the Internet).

The robot 1020 includes a robot control system 1060, one or more operational components 1040a-1040n, and one or more sensors 1042a-1042m. The sensors 1042a-1042m may include, for example, cameras, depth sensors, light sensors, pressure sensors, pressure wave sensors (e.g., microphones), proximity sensors, accelerometers, gyroscopes, thermometers, barometers, and so forth. While sensors 1042a-m are depicted as being integral with robot 1020, this is not meant to be limiting. In some implementations, sensors 1042a-m may be located external to robot 1020, e.g., as standalone units.

Operational components 1040a-1040n may include, for example, one or more end effectors and/or one or more servo motors or other actuators to effectuate movement of one or more components of the robot. For example, the robot 1020 may have multiple degrees of freedom and each of the actuators may control actuation of the robot 1020 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 1060 may be implemented in one or more processors, such as a CPU, GPU, and/or other controller(s) of the robot 1020. In some implementations, the robot 1020 may comprise a "brain box" that may include all or aspects of the control system 1060. For example, the brain box may provide real time bursts of data to the operational components 1040a-n, with each of the real time bursts comprising a set of one or more control commands that dictate, inter alia, the parameters of motion (if any) for each of one or more of the operational components 1040a-n. In some implementations, the robot control system 1060 may perform one or more aspects of method 800 of FIG. 8.

As described herein, in some implementations all or aspects of the control commands generated by control system 1060 in positioning an end effector to grasp an object may be based on grasping parameters generated based on application of image data for the object to convolutional neural network 1014. For example, a depth camera of the sensors 1042a-m may capture image data and the grasping parameters determined based on a GPU of the robot 1020 and/or the computing device 1010 applying the image data to the convolutional neural network 1014. Although control system 1060 is illustrated in FIG. 10 as an integral part of the robot 1020, in some implementations, all or aspects of the control system 1060 may be implemented in a component that is separate from, but in communication with, robot 1020. For example, all or aspects of control system 1060 may be implemented on one or more computing devices that are in wired and/or wireless communication with the robot 1020 such as computing device 1010.

Also, although convolutional neural network 1014 is illustrated in FIG. 10 as part of computing device 1010, in some implementations convolutional neural network 1014 may additionally and/or alternatively be provided as part of robot 1020. For example, the control system 1060 may comprise a GPU and may apply image data to CNN 1014 stored locally at the robot 1020 (in memory and/or other storage medium) to generate grasping parameters. For instance, one or more depth cameras of the sensors 1042a-m may capture image data and the grasping parameters determined by the robot control system 160 based on applying aspects of the image data to the locally stored convolutional neural network 1014.

Figure 11:
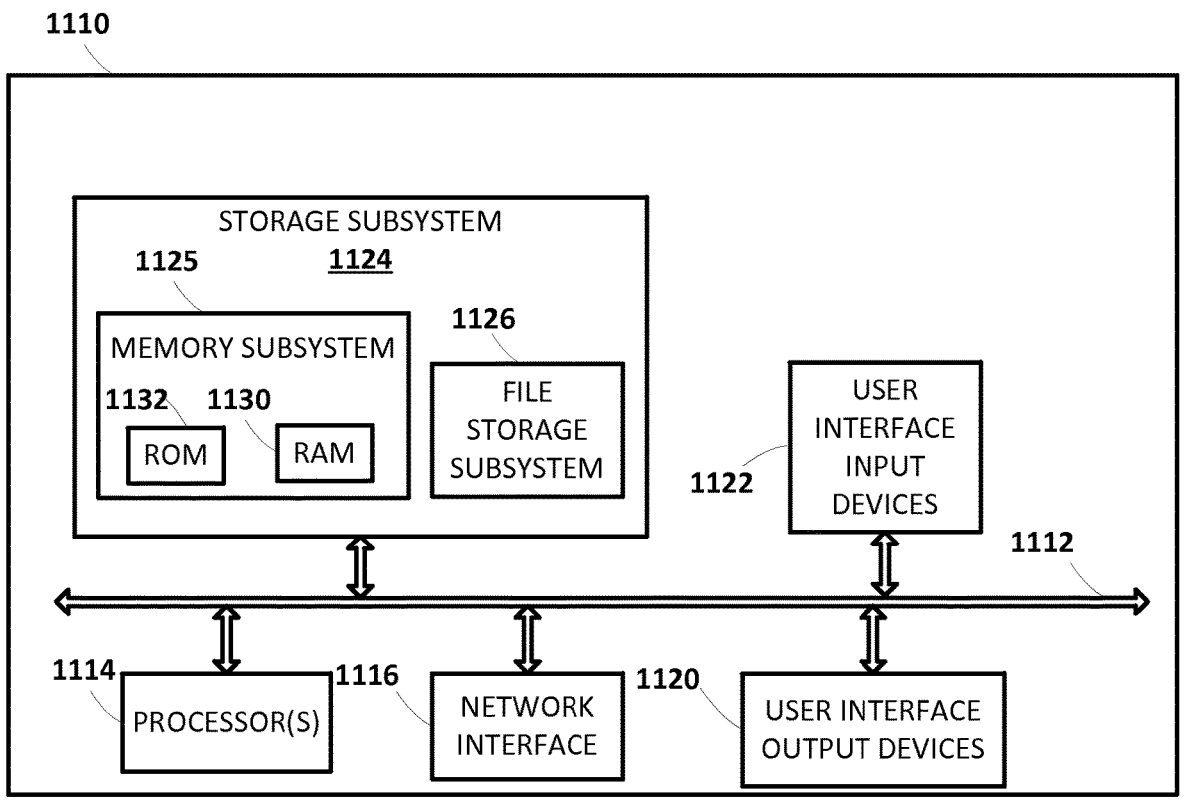
FIG. 11 schematically depicts an example architecture of a computer system.

FIG. 11 is a block diagram of an example computing device 1110 that may optionally be utilized to perform one or more aspects of techniques described herein. Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of the method of FIGS. 1, 5, and/or 8.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   applying, to an input layer of a trained convolutional neural network, an image that includes an object;
   generating, as output of the convolutional neural network and in a single regression through the convolutional neural network and based on the image:
   a respective vector of values for each cell of an N by N partition of the image, wherein N is greater than one, and wherein the values for each of the respective vectors comprise:
   a respective width of a respective rectangle,
   a respective height of the respective rectangle,
   a respective first dimension coordinate of the respective rectangle,
   a respective second dimension coordinate of the respective rectangle, a respective confidence measure for the respective rectangle, and
a respective indication of a classification category;
selecting a given rectangle, of the respective rectangles, based on the respective confidence measure for the given rectangle; and
performing one or more further actions based on the selected given rectangle and the respective indication of the classification category for the given rectangle.

2. The method of claim 1, wherein performing the one or more further actions based on the selected given rectangle and the respective indication of the classification category for the given rectangle comprises:
generating one or more control commands for a robot based on the given rectangle and the classification category; and
providing the control commands to at least one actuator of the robot.

3. The method of claim 1, wherein performing the one or more further actions based on the given rectangle and the respective indication of the classification category for the given rectangle comprises:
positioning a robot grasping end effector based on the given rectangle; and
causing the robot grasping end effector to attempt a grasp with a grasping parameter that is based on the classification category.

4. The method of claim 3, wherein the grasping parameter is grasping strength.

5. The method of claim 1, wherein the values for each of the respective vectors further comprise at least one respective orientation parameter for the respective rectangle.

6. The method of claim 1, wherein the image comprises a depth channel, a first color channel, and a second color channel.

7. A method implemented by one or more processors, the method comprising:
identifying an image that includes an object;
generating a training example output that comprises a respective labeled vector for each cell of a multi-cell partition of the image, and wherein the respective labeled vector for each of the cells comprises:
a respective labeled width of a respective rectangle,
a respective labeled height of the respective rectangle,
a respective labeled first dimension coordinate of the respective rectangle,
a respective labeled second dimension coordinate of the respective rectangle,
a respective labeled confidence measure for the respective rectangle, and
a respective labeled indication of a classification category;
providing, as a training example for a convolutional neural network, the image as input of the training example and the training example output as output of the training example; and
training the convolutional neural network based on the training example.

8. The method of claim 7, further comprising:
after training the convolutional neural network based on the training example and additional training examples, using the trained convolutional neural network in control of a robot.

9. The method of claim 8, wherein using the trained convolutional neural network in control of the robot comprises:
applying, as input to the trained convolutional neural network, an additional image captured by a vision sensor of the robot;
generating, in a single regression through the convolutional neural network and based on the additional image:
a predicted width of a predicted rectangle of a cell of the additional image,
a predicted height of the predicted rectangle,
a predicted first dimension coordinate of the predicted rectangle,
a predicted second dimension coordinate of the predicted rectangle,
a predicted confidence measure for the predicted rectangle, and
a predicted indication of a classification category;
selecting the predicted rectangle based on the predicted confidence measure;
generating one or more control commands for the robot based on the selected predicted rectangle and the predicted indication of the classification category; and
providing the control commands to at least one actuator of the robot.

10. The method of claim 7, further comprising:
after training the convolutional neural network based on the training example and additional training examples:
storing the trained convolutional neural network locally at a robot for control of the robot using the trained convolutional neural network.

11. The method of claim 7, wherein the image that includes the object is a modified version of a base electronic image, and further comprising generating the image based on:
translating and rotating the base image.

12. The method of claim 7, wherein training the convolutional neural network based on the training example comprises:
backpropagating an error determined based on the respective labeled confidence measures and predicted confidence measures predicted based on processing of the training example input using the convolutional neural network.

13. The method of claim 7, wherein the image comprises a depth channel, a first color channel, and a second color channel.

14. A system, comprising:
a camera;
a trained convolutional neural network;
at least one processor that:
applies, to an input layer of the trained convolutional neural network, an image captured by the camera, wherein the image includes an object;
generates, as output of the convolutional neural network and in a single regression through the convolutional neural network and based on the image:
a respective vector of values for each cell of an N by N partition of the image, wherein N is greater than one, and wherein the values for each of the respective vectors comprise:
a respective width of a respective rectangle,
a respective height of the respective rectangle,
a respective first dimension coordinate of the respective rectangle,
a respective second dimension coordinate of the respective rectangle,
a respective confidence measure for the respective rectangle, and a respective indication of a classification category;

selects a given rectangle, of the respective rectangles, based on the respective confidence measure for the given rectangle; and transmits data to cause performance of one or more further actions based on the selected given rectangle and the respective indication of the classification category for the given rectangle.

15. The system of claim 14, wherein the data comprises one or more control commands for a robot, wherein in transmitting the data the at least one processor is to transmit the control commands to at least one actuator of the robot, and wherein the at least one processor is further to:

generate the control commands for the robot based on the given rectangle and the classification category.

16. The system of claim 14, wherein in transmitting the data the at least one processor is to transmit the data to:

position a robot grasping end effector based on the given rectangle; and cause the robot grasping end effector to attempt a grasp with a grasping parameter that is based on the classification category.

17. The system of claim 16, wherein the grasping parameter is grasping strength.

18. The system of claim 14, wherein the values for each of the respective vectors further comprise at least one respective orientation parameter for the respective rectangle.

19. The system of claim 14, wherein the image comprises a depth channel, a first color channel, and a second color channel.

* * * * *